United States Patent
Harrington et al.

(10) Patent No.: US 10,686,907 B2
(45) Date of Patent: Jun. 16, 2020

(54) REDUCING BANDWIDTH CONSUMPTION AND LATENCY IN SATELLITE COMMUNICATIONS

(71) Applicant: Hughes Network Systems, LLC, Germantown, MD (US)

(72) Inventors: Emanuel Girard Harrington, Bowie, MD (US); Frank Li, Herndon, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 319 days.

(21) Appl. No.: 15/686,206

(22) Filed: Aug. 25, 2017

(65) Prior Publication Data

US 2019/0068742 A1    Feb. 28, 2019

(51) Int. Cl.
*H04L 29/08* (2006.01)
*H04B 7/185* (2006.01)
*H04W 84/06* (2009.01)

(52) U.S. Cl.
CPC ..... *H04L 67/2847* (2013.01); *H04B 7/18523* (2013.01); *H04B 7/18578* (2013.01); *H04L 67/22* (2013.01); *H04W 84/06* (2013.01)

(58) Field of Classification Search
CPC ... H04L 67/2847; H04L 67/22; H04L 12/189; H04L 12/5692; H04L 29/06; H04L 67/02; H04L 67/2842; H04W 84/06; H04B 7/18578; H04B 7/18523; H04B 7/18582
See application file for complete search history.

(56) References Cited

U.S. PATENT DOCUMENTS

| | | |
|---|---|---|
| 6,167,438 A | 12/2000 | Yates et al. |
| 6,907,429 B2 | 6/2005 | Carneal et al. |
| 7,782,823 B2 | 8/2010 | Lee et al. |
| 9,549,012 B2 | 1/2017 | Cox et al. |
| 2002/0010761 A1 | 1/2002 | Carneal et al. |

(Continued)

OTHER PUBLICATIONS

PCT International Search Report in International Application No. PCT/US2018/047652, dated Nov. 12, 2018, 14 pages.

(Continued)

*Primary Examiner* — Hai V Tran
*Assistant Examiner* — Tien M Nguyen
(74) *Attorney, Agent, or Firm* — Fish & Richardson P.C.

(57) ABSTRACT

Methods, systems, and apparatus, including computer programs encoded on a computer storage medium, for providing an electronic resource to multiple users that are associated with the electronic resource. In some implementations, a method includes identifying multiple users, as a proper subset of users of a satellite communication network, that are each associated with an electronic resource. Satellite terminals of the satellite communication network corresponding to the identified users are identified. Satellite transmission data is generated that includes the electronic resource and designates the identified satellite terminals. A satellite gateway transmits the satellite transmission data over the satellite communication network in a satellite broadcast to the identified satellite terminals, such that the identified satellite terminals can concurrently receive data associated with the electronic resource without sending a request for data associated with the electronic resource.

20 Claims, 4 Drawing Sheets

(56) References Cited

U.S. PATENT DOCUMENTS

| | | | | |
|---|---|---|---|---|
| 2002/0073167 A1* | 6/2002 | Powell | ............... | H04L 12/5692 |
| | | | | 709/217 |
| 2005/0210121 A1* | 9/2005 | Taylor | ................ | H04L 67/2847 |
| | | | | 709/218 |
| 2012/0297490 A1* | 11/2012 | Barraclough | .......... | G06F 21/10 |
| | | | | 726/26 |
| 2012/0300687 A1* | 11/2012 | Aksu | ...................... | H04W 4/06 |
| | | | | 370/312 |

OTHER PUBLICATIONS

"The View from Jupiter: High-Throughput Satellite Systems," Hughes Network Systems, LLC, Jul. 2013, p. 1-16.
"IP over Satellite (IPoS)—The Standard for Broadband over Satellite," Hughes Network Systems, LLC, Jun. 2007, p. 1-6.
'Wikipedia.com' [online]. "Satellite Internet access," Aug. 2017, retrieved from the Internet: URLhttps://en.wikipedia.org/wiki/Satellite_Internet_access. 11 pages.
'Wikipedia.com' [online]. "User Datagram Protocol," Aug. 2017, retrieved from the Internet: URLhttps://en.wikipedia.org/wiki/User_Datagram_Protocol. 4 pages.
'Wikipedia.com' [online]. "Transmission Control Protocol," Aug. 2017, retrieved from the Internet: URLhttps://en.wikipedia.org/wiki/Transmission_Control_Protocol. 11 pages.
'HughesNet.com' [online]. "How It Works: How does Hughes provide Internet via satellite?" Hughes Network Systems, LLC, 2017, retrieved from the Internet: URLhttps://www.hughesnet.com/why-hughesnet/how-it-works. 3 pages.

\* cited by examiner

REDUCING BANDWIDTH CONSUMPTION AND LATENCY IN SATELLITE COMMUNICATIONS

BACKGROUND

Communications satellites are commonly used to transmit data between gateways and terminals. For example, communications satellites are used to provide Internet access to many users. As satellite bandwidth is finite and can sometimes be exhausted during peak periods, users may be limited to a specified amount of data downloaded over a specified time period or during peak periods.

SUMMARY

In some implementations, a satellite gateway can provide an electronic resource (or other data) to multiple users that are associated with the electronic resource, e.g., users that may be interested in the electronic resource or that have expressed an interest in receiving the electronic resource. For example, users can subscribe to receive electronic resources or updates to electronic resources periodically or when the resource is updated. In another example, a system can determine that a user is likely to request the electronic resource, e.g., based on previous requests received from the user. When the electronic resource is going to be transmitted by the satellite gateway, the satellite gateway can generate satellite transmission data that includes the electronic resource and designates the satellite terminal of each of the users that are associated with the electronic resource. The electronic resource can be stored in local memory (e.g., a local cache) for quick access by the users' devices when the users' request the electronic resource.

By transmitting the electronic resource to the satellite terminal of each user in the same satellite transmission, the amount of consumed satellite bandwidth is substantially reduced in comparison to transmitting the electronic resource to the satellite terminal of each user in response to individual requests received from the satellite terminals. As the electronic resource is stored in local memory prior to being requested by the users, the amount of bandwidth used to request the electronic resource is also reduced. For example, when a user requests an electronic resource that has already been transmitted to the user's device, the user's device can first check the local memory for the electronic resource. If the electronic resource is stored in the local memory, the user device can load the electronic resource from the local memory without transmitting a request over the satellite communication network.

By storing the electronic resource in local memory prior to a user requesting the electronic resource, the electronic resource can be loaded and presented to the user quicker. For example, the latency in transmitting a request over the satellite communication network, the satellite gateway retrieving the electronic resource, and the satellite gateway transmitting the electronic resource over the satellite communication network can be avoided.

In some implementations, electronic resources that are transmitted to a user's satellite terminal prior to the user requesting the electronic resource (e.g., based on a subscription) may not count against the user's data usage limit (or may not count against the limit as much as a requested electronic resource). This allows the user to download more content before reaching the data usage limit, resulting in greater user satisfaction with the service. The reduced latency in loading electronic resources form local memory also results in greater user satisfaction.

In one general aspect, the techniques disclosed herein describe methods of providing an electronic resource to multiple users that are associated with the electronic resource. According to some of the methods, a one or more processors identify multiple users, as a proper subset of users of a satellite communication network, that are each associated with an electronic resource. The one or more processors identify satellite terminals of the satellite communication network corresponding to the identified users that are each associated with the electronic resource. The one or more processors generate satellite transmission data that includes the electronic resource and designates the identified satellite terminals. A satellite gateway in data communication with the one or more processors transmit the satellite transmission data over the satellite communication network in a satellite broadcast to the identified satellite terminals, such that the identified satellite terminals can concurrently receive data associated with the electronic resource without sending a request for data associated with the electronic resource.

In some implementations, generating the satellite transmission data includes configuring a satellite transmission layer of the satellite transmission data to specify each of the identified satellite terminals. Configuring the satellite transmission layer can include configuring a header of the satellite transmission data to specify each of the identified satellite terminals.

In some implementations, transmission of the electronic resource to each identified satellite terminal does not increase a data usage measure representing an amount of satellite-transmitted data used by a user of the identified satellite terminal.

In some implementations, transmission of the electronic resource to each identified satellite terminal increases a data usage measure representing an amount of satellite-transmitted data used by a user of the identified satellite terminal by a first amount that is less than a second amount with which the data usage measure for the user is increased in response to a user-submitted request for the electronic resource.

In some implementations, identifying the multiple users includes determining that at least one of the identified users has subscribed to receiving the electronic resource. Identifying the multiple users can include determining that at least one of the identified users previously requested other electronic resources from a source of the electronic resource. Identifying the multiple users can include determining that at least one of the identified users previously requested a previous version of the electronic resource.

In some implementations, each identified satellite terminal stores the electronic resource in a local cache of the identified satellite terminal or a local cache of a user device in data communication with the identified satellite terminal. When a particular identified satellite terminal corresponding to a particular identified user requests the electronic resource, the particular identified satellite terminal determines that the electronic resource is stored in the local cache of the particular identified satellite terminal or the local cache of the user device in data communication with the particular identified satellite terminal and loads the electronic resource from the local cache rather than transmitting a request for the electronic resource to the satellite gateway.

In some implementations, the electronic resource includes at least one of a digital file, a web page, an application page, text data, video data, image data, or audio data.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
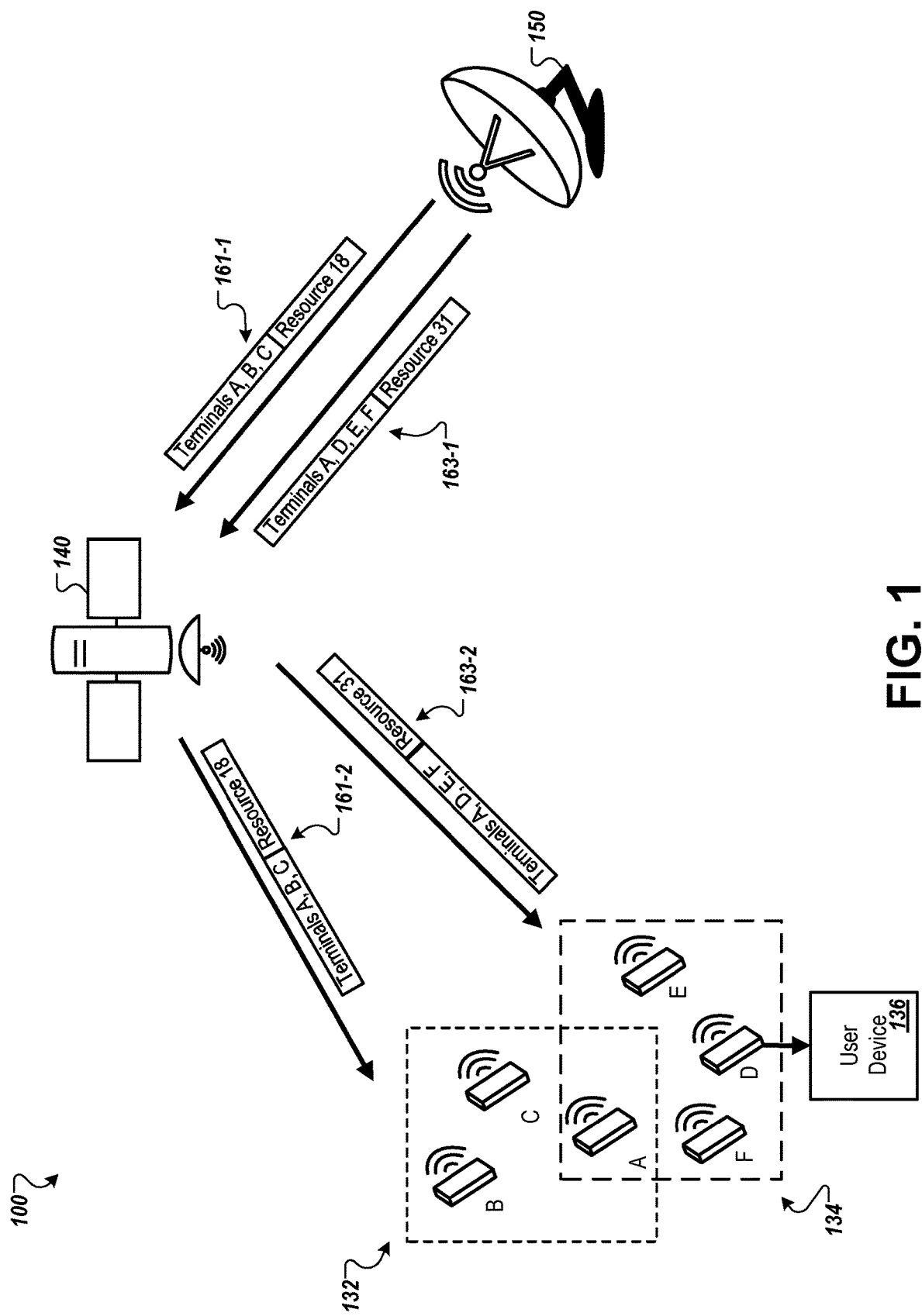
FIG. 1 is a diagram that illustrates an example of a system in which a satellite gateway provides electronic resources to satellite terminals.

FIG. 1 is a diagram that illustrates an example of a system 100 in which a satellite gateway 150 provides electronic resources to satellite terminals 132 and 134. The satellite gateway 150 can provide electronic resources and/or other data to the satellite terminals 132 and 134 by way of a satellite 140. The satellite 140, the satellite gateway 150, and the satellite terminals 132 and 134 can be part of a satellite communication network that includes one or more satellites, one or more gateways, and multiple satellite terminals.

The electronic resources can include web pages, application pages (e.g., native application pages), videos, audio (e.g., music and/or voice), images, electronic documents, and/or other electronic data. For example, the satellite gateway 150 can be operated by an Internet provider that provides Internet access to users via the satellite 140. The electronic resources can be resources that are available over the Internet.

The satellite terminals 132 and 134 can transmit data to the satellite gateway 150 and receive data from the satellite gateway 150 via the satellite 140. User devices can be in data communication with the satellite terminals 132 and 134. For example, a user device 136 is in data communication with satellite terminal D. Example user devices include smartphones, personal computers, tablet computers, virtual assistants, smart televisions, wearable devices, and/or other types of user devices can transmit and receive data using a satellite terminal. A satellite terminal can include (or be connected to) a modem and/or router for transmitting data to and receiving data from user devices.

The gateway 150 can provide electronic resources to the satellite terminals 132 and 134 in response to requests received from the satellite terminals 132 and 134. For example, a user of a user device can request a web page using a web browser executing on the user device. A satellite terminal in data communication with the user device can transmit the request to the satellite gateway 150 via the satellite 140. The satellite gateway 150 can receive the request and provide the web page to the satellite terminal and, in turn, the satellite terminal can provide the web page to the user device.

As described in more detail below, the gateway 150 can also push electronic resources and/or other data to the satellite terminals, e.g., automatically without receiving a request for the electronic resource from the satellite terminals. For example, one or more users can be associated with an electronic resource. A user can be associated with an electronic resource by subscribing to receive the electronic resource, by being included in a list of users designated to receive the electronic resource, and/or based on a user profile or usage history that indicates interest in the electronic resource (or resources of the same type or category as the electronic resource).

The satellite gateway 150 can transmit an electronic resource that is associated with multiple users in the same satellite transmission. For example, the satellite gateway 150 can transmit the electronic resource to the multiple users periodically based on a time period for the electronic resource (which may vary from resource to resource), in response to the electronic resource being updated, in response to a user (e.g., one of the multiple users) requesting the electronic resource, and/or based on other appropriate criteria. To transmit the electronic resource to the multiple users, the satellite gateway 150 can generate satellite transmission data that includes the electronic resource and that designates a respective satellite terminal of each user of the multiple users associated with the electronic resource. The satellite gateway 150 can transmit the satellite transmission data to the satellite 140. In turn, the satellite 140 can broadcast the satellite transmission data across the satellite's ground footprint (e.g., within the satellite's transmission area) so that the satellite terminals of the multiple users can receive the electronic resource.

For example, the satellite terminals 132 are satellite terminals of users associated with electronic resource 18 and the satellite terminals 134 are satellite terminals of users associated with electronic resource 31. When the satellite gateway 150 transmits the electronic resource 18, the satellite gateway 150 can designate each of the satellite terminals 132 in satellite transmission data 161-1 transmitted to the satellite 140. For example, the electronic resource 18 may be a web page that is updated multiple times a day. The satellite gateway 150 can transmit the electronic resource 18 periodically throughout the day or after each update.

Each time the satellite gateway 150 transmits the electronic resource 18, the satellite gateway can generate satellite transmission data 161-1 that includes the electronic resource 18 (or data of the electronic resource 18). The satellite transmission data 161-1 can also designate the satellite terminal 132 for each user associated with the electronic resource 18. For example, the satellite transmission data 161-1 can specify a unique identifier for each of the satellite terminals 132. The satellite gateway 150 transmits the satellite transmission data 161-1 to the satellite 140. In turn, the satellite 140 transmits satellite transmission data 161-2 to satellite terminals within its ground footprint. The satellite transmission data 161-2 also includes the electronic resource 18 and designates the satellite terminals 132 of the users associated with the electronic resource 18.

The satellite terminals within the satellite's ground footprint can receive the satellite transmission data 161-2 from the satellite 140. Each satellite terminal can determine whether to store the electronic resource 18 based on the satellite transmission data. For example, each satellite terminal can determine whether the satellite transmission data 161-2 includes data specifying the identifier of the satellite terminal. In this example, the satellite terminals 132 can determine that they are designated by the satellite transmission data 161-2 and store the electronic resource 18, e.g., in local memory of the satellite terminal or local memory of a user device in data communication with the satellite terminal. Satellite terminals that are not designated by the satellite transmission data, e.g., satellite terminal E, can disregard the satellite transmission data 161-2 and/or determine to not store the electronic resource.

In some implementations, satellite terminals that are not designated by satellite transmission data 161-2 cannot access the electronic resource 18 included in the satellite transmission data 161-2. For example, the electronic resource 18 may be encrypted using one or more keys. The satellite terminals 18 that are designated by the satellite transmission data 161-2 can include a corresponding key for decrypting the electronic resource 18 while satellite terminals that are not designated by the satellite transmission data 161-2 may not include a corresponding key for decrypting the electronic resource 18.

In some implementations, the electronic resource 18 can be encrypted using a widely distributed key (e.g., a key provided to each satellite terminal) or not encrypted at all. In this example, each satellite terminal can determine individually whether to accept the satellite transmission data 161-2, e.g., based on whether the satellite transmission data 161-2 designates the satellite terminal.

Similarly, each time the satellite gateway 150 transmits the electronic resource 31, the satellite gateway can generate satellite transmission data 163-1 that includes the electronic resource 31 (or data of the electronic resource 31). The satellite transmission data 163-1 can also designate the satellite terminal 134 for each user associated with the electronic resource 31. For example, the satellite transmission data 163-1 can specify a unique identifier that identifies each of the satellite terminals 134. The satellite gateway 150 transmits the satellite transmission data 163-1 to the satellite 140. In turn, the satellite 140 transmits satellite transmission data 163-2 to satellite terminals within its ground footprint. The satellite transmission data 163-2 also includes the electronic resource 31 and designates the satellite terminals 134 of the users associated with the electronic resource 31.

The satellite terminals within the satellite's ground footprint can receive the satellite transmission data 163-2 from the satellite 140. Each satellite terminal can determine whether to store the electronic resource 31 based on the satellite transmission data. For example, each satellite terminal can determine whether the satellite transmission data 163-2 includes data specifying the identifier of the satellite terminal. In this example, the satellite terminals 134 can determine that they are designated by the satellite transmission data 163-2 and store the electronic resource 31, e.g., in local memory of the satellite terminal or local memory of a user device in data communication with the satellite terminal. Satellite terminals that are not designated by the satellite transmission data, e.g., satellite terminal B, can disregard the satellite transmission data 163-2 and/or determine to not store the electronic resource.

The users associated with a particular electronic resource can include a proper subset of the users of a satellite communication network. A proper subset is a subset that includes less than all members of a set. For example, a proper subset of users of a satellite communication network can include one or more users but not all users of the satellite communication network. A proper subset of users can include one or more users that have satellite terminals within a satellite's ground footprint, but not all users that have satellite terminals within the satellite's ground footprint.

A user can be associated with more than one electronic resource. For example, the user of satellite terminal A is associated with the electronic resource 18 and the electronic resource 31 as the user may have subscribed to receive both resources. Thus, the satellite terminal A can receive and store the electronic resources 18 and 31 when the electronic resources 18 and 31 are broadcast by the satellite 140.

Some electronic resources can be broadcast to all users of the satellite communication network. For example, a popular web page can be transmitted in satellite transmission data that designates that all users are to receive the popular web page. Each satellite terminal in the satellite communication network can receive the satellite transmission data and store the popular web page in local memory.

Figure 2:
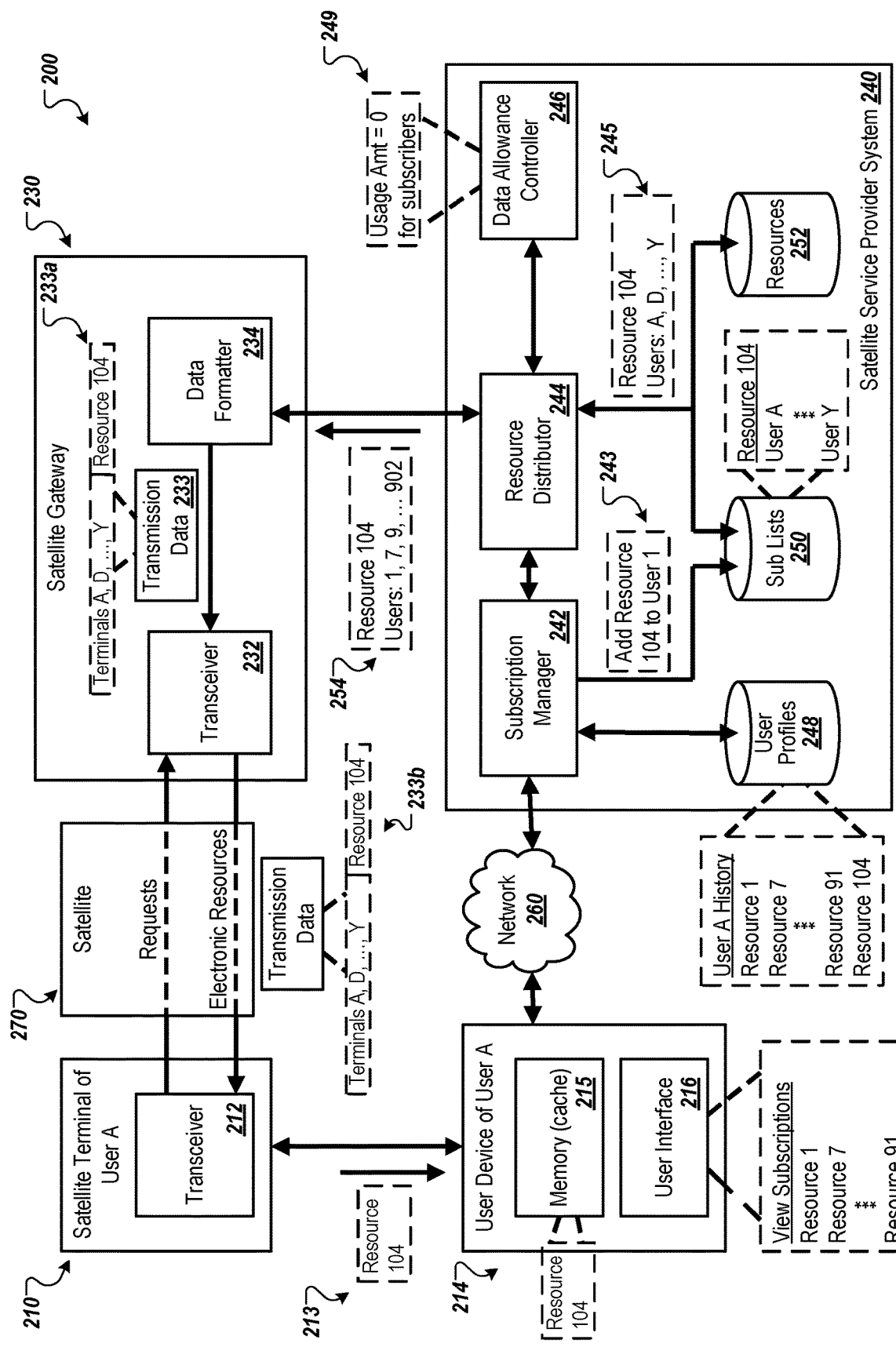
FIG. 2 is a diagram that illustrates an example of a system in which a satellite gateway provides electronic resources to satellite terminals.

FIG. 2 is a diagram that illustrates an example of a system 200 in which a satellite gateway 230 provides electronic resources to satellite terminals, including a satellite terminal 210 of user A. The satellite gateway 230 can receive electronic resources and/or other data from a satellite service provider system 240 of a satellite service provider, e.g., a satellite Internet provider, and provide the electronic resources and/or other data to satellite terminals. The satellite service provider can operate a satellite communication network that includes the satellite gateway 230, a satellite 270, and satellite terminals.

A user can use a user device to view and/or listen to electronic resources. For example, user A can use user device 214 to view and/or listen to electronic resources received from the satellite service provider system 240. The user device 214 can include a web browser and/or other applications that present electronic resources. The user device 214 also includes memory 215 and a user interface 216. The memory 215 can include a cache for storing electronic resources received from the satellite service provider system 240. As described in more detail below, the user interface 216 enables user A to manage subscriptions to electronic resources.

The user device 214 can request and receive electronic resources from the satellite service provider system 240 by way of a satellite terminal 210. For example, the user device 214 can be in wired or wireless communication with the satellite terminal 210, e.g., via one or more routers and/or modems. The satellite terminal 210 includes a transceiver 212 that can transmit data to and receive data from the satellite 270. For example, the transceiver 212 can transmit a request for an electronic resource to the satellite 270 and receive the electronic resource from the satellite 270. The satellite terminal 210 can then send the electronic resource to the user device 214 for presentation to user A.

The satellite service provider system 240 includes a subscription manager 242 that maintains associations between electronic resources and users. As described above, a user can be associated with an electronic resource by subscribing to receive the electronic resource, by being included in a list of users designated to receive the electronic resource, and/or based on a user profile or usage history that indicates interest in the electronic resource (or resources of the same type or category as the electronic resource). For each electronic resource, the subscription manager 242 can manage a subscription list 250 that includes a list of users that are associated with the electronic resource and to which the electronic resource will be provided when the electronic resource is transmitted by the satellite gateway 230.

The subscription manager 242 enables users to subscribe to electronic resources that the users would like to receive. For example, a user may frequently view a particular web page. Instead of requesting the web page from the satellite service provider system 240 each time the user attempts to access the electronic resource, the user can subscribe to receive the electronic resource in broadcasts from the satellite 270. The satellite service provider system 240 can broadcast the electronic resource to each user that has subscribed to the electronic resource periodically based on a specified time period for the electronic resource and/or each time the electronic resource is updated.

When a user subscribes to an electronic resource, the subscription manager 242 can add the user to the subscription list 250 for the electronic resource and/or to a subscription list 250 for the user. The subscription list for an electronic resource can include a proper subset of the users that use the satellite service provided by the satellite service provider. For example, the subscription list for a particular electronic resource can include one or more users, but less than all users that use the satellite service. In another example, the subscription list for a particular electronic resource can include one or more users, but less than all of the users that have satellite terminals in the transmission area of the satellite 270.

In some implementations, the user can manage subscriptions using the user interface 216. For example, the subscription manager 242 can provide the user interface to each user so that the user can manager subscriptions to the electronic resources. The user interface 216 can be presented by a web browser or another application (e.g., a native application provided by the satellite service provider). The user interface 216 can present a subscription list 250 that includes a list of electronic resources that the user is currently subscribed to receive. The user can use the user interface 216 to add electronic resources to the subscription list 250 and to remove electronic resources from the subscription list 250.

In some implementations, the user interface 216 can be accessed over a network 260 that is different from the satellite communication network. For example, the network 260 can include a local area network (LAN), a wide area network (WAN), the Internet, a mobile network, or a combination thereof. In a particular example, the network 260 can be a mobile network or land-based network (e.g., cable, DSL, or fiber) that does not include satellite transmissions. In this way, managing a subscription list 250 would not count against a satellite data usage measure of the user.

The subscription manager 242 can also associate users with electronic resources automatically, e.g., without input from the users. For example, the subscription manager 242 can add electronic resources to the subscription list 250 of user A automatically without input from user A or with approval from user A. In some implementations, the subscription manager 242 associates a user with an electronic resource based on a user profile 248 of the user. The user profile 248 of a user can include information about the user (e.g. demographic information) and/or access history of the user. The access history can include data indicating electronic resources previously accessed by the user (e.g., via the satellite communication network) and for each electronic resource in the access history, a time at which the electronic resource was accessed by the user.

The subscription manager 242 can add an electronic resource to a user's subscription list 250 if the user has accessed the electronic resource at least a specified number of times within a specified time period. The subscription manager 242 can also add an electronic resource to a user's subscription list 250 if the user has shown an interest in the topic or category of the electronic resource (e.g., based on accessing other electronic resources of the same topic or category at least specified number of times). The subscription manager 242 can also add an electronic resource to the user's subscription list 250 based on other users accessing the electronic resource, e.g., based on other users in the same area or in the same age group. If the user does not want to subscribe to an electronic resource added to the subscription list 250, the user can use the user interface 216 to remove the electronic resource from the subscription list 250.

As shown in FIG. 2, the user profile of user 1 indicates that user 1 has accessed resource 104 although resource 104 is not included in the subscription list for user 1. Based on the user's access of resource 104 (e.g., at least a specified number of times), the subscription manager 242 can add user A to the subscription list for resource 104 as shown in the dashed box 243. The subscription manager 242 can also add resource 104 to the subscription list for user A.

The satellite service provider system 240 also includes a resource distributor 244. The resource distributor 244 can send electronic resources to the satellite gateway 230 for transmission to satellite terminals of users. For example, the resource distributor 244 can receive a request for an electronic resource from a user device via the satellite gateway 230. In response, the resource distributor 244 can obtain a latest version of the electronic resource from an electronic resources data storage device 252 (e.g., one or more hard drives, flash memory, etc.) that stores the electronic resources. The resource distributor 244 can then send, to the satellite gateway 230, the electronic resource and data identifying the satellite terminal of the user that requested to the electronic resource so that the satellite gateway 230 can transmit the electronic resource to the satellite terminal of the user.

The resource distributor 244 can also transmit electronic resources to the users that are associated with the electronic resources, e.g., automatically without receiving a request for the electronic resources. For example, each electronic resource to which one or more users are subscribed may have an associated time period at which the electronic resource is periodically pushed to the one or more users. The time period for one resource can be different from the time period of other resources. For example, electronic resources that are updated frequently may have a shorter time period than less frequently updated electronic resources. When the time period for a particular electronic resource lapses, the resource distributor 244 can obtain the latest version of the electronic resource from the electronic resources data storage device 252. The resource distributor 244 can also obtain a subscription list 250 for the electronic resource. The resource distributor 244 can provide the electronic resource and data specifying each user (or the satellite terminal of each user) that is subscribed to the electronic resource to the satellite gateway 230 for transmission to the satellite terminals of the users. The resource distributor 244 can then reset a timer for the electronic resource to the time period for the electronic resource to determine when to transmit the electronic resource again.

In another example, the resource distributor 244 can transmit an electronic resource to the users associated with the electronic resource in response to the electronic resource being updated. For example, the resource distributor 244 can detect when a new version of the electronic resource has been added to the electronic resources data storage device 252. In response to detecting that an electronic resource has been updated, the resource distributor 244 can provide the updated electronic resource and data specifying each user (or the satellite terminal of each user) that is subscribed to the electronic resource to the satellite gateway 230 for transmission to the satellite terminals of the users.

Continuing the example for resource 104 above, the resource distributor 244 can determine to transmit resource 104 based on a time period for the resource 104 lapsing or based on resource 104 being updated. In response, the resource distributor 244 can obtain resource 104 from the electronic resource data storage unit 252. The resource distributor 244 can also obtain the subscription list 250 for resource 104, which now includes user A based on the addition of user A by the subscription manager 242. The resource distributor 244 can provide, to the satellite gateway 230, data 254 that includes resource 104 and data specifying the users associated with resource 104 (or data identifying the satellite terminals of the users associated with the resource) for transmission to the satellite 270 and then to the users associated with resource 104.

The satellite service provider system 240 also includes a data allowance controller 246 that monitors satellite data usage for the users of the satellite communication network and limits the amount of data users can download during a specified time period. For example, the satellite service provider can implement a Fair Access Policy (FAP) in which users are allowed up to a specified amount of satellite data usage over a specified time period (e.g., each day, week, or month). When the user reaches the specified amount of satellite data usage, the user may be prevented from downloading additional data over the satellite communication network or the user's access speed may be reduced to allow other users a fair amount of access to data using the satellite communication network.

The data allowance controller 246 can maintain, for each user, a data usage measure that represents an amount of data an amount of satellite data used by the user during the time period. When the user downloads an electronic resource over the satellite communication network, the data allowance controller 246 can update the data usage measure for the user. For example, the data allowance controller 246 may increase the user's data usage measure by an amount of data that is based on the data size of the electronic resource. In a particular example, if the electronic resource consumes 1 megabyte (MB) of data, the data allowance controller 246 can increase that user's data usage measure by 1 MB each time the user downloads the electronic resource. In another example, the data allowance controller 246 can update the amount of satellite data used by the user by deducting the used amount from an amount of data remaining for the specified time period based on the data size of the electronic resource.

When a user's data usage measure meets or exceeds a data limit for a specified time period, the satellite service provider can prevent the user from downloading additional content or throttle the user's satellite terminal by slowing the speed at which content it transmitted to the user's satellite terminal. As electronic resources that are transmitted to multiple users at one time consume less bandwidth than transmitting the electronic resource to each user individually in response to requests for the electronic resource, the data allowance controller 246 can treat these transmissions differently.

In some implementations, electronic resources that are pushed to a user's satellite terminal based on the user being associated with the electronic resource does not affect the user's data usage measure. For example, when the resource distributor 244 transmits an electronic resource to the users associated with the resource based on the electronic resource's time period lapsing or the electronic resource being updated, the data allowance controller 246 does not increase the users' data usage measure for that transmission. In another example, the data allowance controller 246 may not increase the amount of satellite data used by the user.

In some implementations, the data allowance controller 246 increases the users' data usage measure a smaller amount for pushed transmissions than the data allowance controller 246 would if the electronic resource was being transmitted in response to a request received over the satellite communication network. For example, the data allowance controller 246 can increase the user's data usage measure by an amount equal to the size of the electronic resource when the electronic resource is being provided in response to a request received over the satellite communication network. If the electronic resource is being transmitted automatically in response to the time period lapsing or the electronic resource being updated, the data allowance controller 246 can increase the user's data usage measure by an amount equal to a portion of the size of the electronic resource. For example, the data allowance controller 246 can increase the user's data usage measure by an amount that is 50% of the data size of the electronic resource, 10% of the data size of the electronic resource, or some other appropriate amount that is less than the data size of the electronic resource.

Thus, if a user often requests the same electronic resource, the user can subscribe to the electronic resource and receive the electronic resource periodically without affecting the user's data allowance or at least reducing the effect on the user's data allowance. By eliminating or reducing the effect of pushed resources on users' data usage measures, users can download more content before reaching the data limit if the users subscribe to (or are otherwise associated with) electronic resources for which the users would normally initiate requests. This also benefits the satellite service provider as less bandwidth is consumed by transmitting the electronic resource to multiple users in a single satellite transmission rather than transmitting the same electronic resource to each user individually using multiple satellite transmissions.

Continuing the example for resource 104 above, when the resource 104 is transmitted to the users associated with resource 104, the data allowance controller 246 increase the data usage measure for each user associated with resource 104 by an amount of zero. Thus, the data allowance of user A may not be affected by this pushed broadcast of resource 104 to the satellite terminal of user A. In other examples, the data allowance controller 246 can increase the data usage measure by an amount that is less than the data size of resource 104 for each user associated with resource 104.

The satellite gateway 230 includes a data formatter 234 that generates satellite transmission data for the transceiver 232. The data formatter 234 can generate the satellite transmission data 233 based on the data 249 received from the resource distributor 244. The data formatter 234 can use the data 249 received from the resource distributor 244 to generate satellite transmission data that includes an electronic resource included in the data 249 and that designates the satellite terminal of each user specified by the data 249.

The satellite transmission data can include one or more data packets that the transceiver 232 transmits to the satellite 270. Each data packet can include a satellite transmission layer that includes data of the electronic resource and that designates the terminal of each user associated with the electronic resource. The data formatter 234 can configure the satellite transmission layer to include the data of the electronic resource and to designate each user associated with the electronic resource. In some implementations, the satellite transmission layer includes data specifying a unique identifier for the satellite terminal of each user associated with the electronic resource.

Continuing the example for resource 104, example satellite transmission data 233a includes data specifying the satellite terminals for users A, D, . . . , Y that are associated with resource 104 based on the subscription list 250 for resource 104. The satellite transmission data 233a also includes data of resource 104. The data formatter 234 sends the satellite transmission data 233a to the satellite transceiver 232. In turn, the satellite transceiver 232 transmits satellite transmission data 233b to the satellite 270. The satellite transmission data 233b also includes data specifying the satellite terminals of users A, D, . . . , Y associated with resource 104 and the data of resource 104.

The satellite 270 transmits the satellite transmission data 233b to the satellite terminals within its ground footprint. The satellite transceivers of the satellite terminals in the footprint can receive the satellite transmission data 233b. The satellite terminals designated by the satellite transmission data 233b can store the electronic resource in memory of the satellite terminal or memory of the user device in data communication with the satellite terminal. For example, the satellite terminal 210 can extract resource 104 from the satellite transmission data 233b and send data 213 that includes resource 140 to the user device 214. The user device 214 of user A can store resource 104 in local memory 215 of the user device 214. The local memory 215 can include a cache, a hard drive, flash memory, or other appropriate types of memory. The satellite terminal 210 can include similar memory to store resource 104.

When a user device or satellite terminal receives an electronic resource that was pushed to the satellite terminal based on an association between the electronic resource and the user of the user device, the electronic resource can be stored in local memory for subsequent access by the user. For example, if the user requests resource 104, e.g., by navigating a web browser to a URL for resource 104, the user device 214 can first attempt to retrieve resource 104 from the local memory 215. If resource is stored in the local memory 215, the user device 214 can load resource 104 from the local memory 215 without transmitting a request over the satellite communication network. This reduces the latency in presenting resource 104 to the user and reduces the consumption of the satellite communication network's bandwidth.

If resource 104 is not stored in the local memory 215, the user device can submit a request to the satellite terminal 210 to request resource 104 from the satellite service provider. If the satellite terminal 210 includes local memory that may store resource 104, the satellite terminal 210 can first check the local memory for resource 104. If resource 104 is stored in local memory of the satellite terminal 210, the satellite terminal 210 can send resource to the user device 214 for presentation to the user without transmitting a request over the satellite communication network. This also reduces the latency in presenting resource 104 to the user and reduces the consumption of the satellite communication network's bandwidth.

If resource 104 is not stored in local memory of the user device 214 or of the satellite terminal 210, the satellite terminal 210 can submit a request for resource 104 to the gateway 230 via the satellite 270. The satellite gateway 230 can retrieve resource 104 from the satellite service provider system 240, as described above, and transmit resource 104 to the satellite terminal 210 via the satellite 270. This request and download of resource 104 can result in the user's satellite data usage measure being increased based on the size of resource 104 whereas accessing resource from local memory may not affect the user's satellite data usage measure.

The user device 214 and/or satellite terminal 210 can update its local memory each time an electronic resource associated with user A is broadcast by the satellite 270. For example, a user may not attempt to view an electronic resource for a couple of days. However, the electronic resource may be transmitted by the satellite 270 multiple times each day. The user device 214 and/or the satellite terminal 210 may replace an older version of the electronic resource each time a newer version of the electronic resource is received. In this way, when the user accesses the electronic resource, the newest version of the electronic resource will be presented to the user.

The user device 214 can also remove electronic resources from the local memory 215 after a specified time period. This allows for more data storage space for newly received electronic resources or other data.

In some implementations, the satellite service provider can include advertisements with electronic resources sent to user devices. For example, the satellite service provider system 240 can select advertisements based on the content of the electronic resource and/or based on the data included in the user's profile (e.g., access history) and provide the advertisement with the electronic resource.

Figure 3:
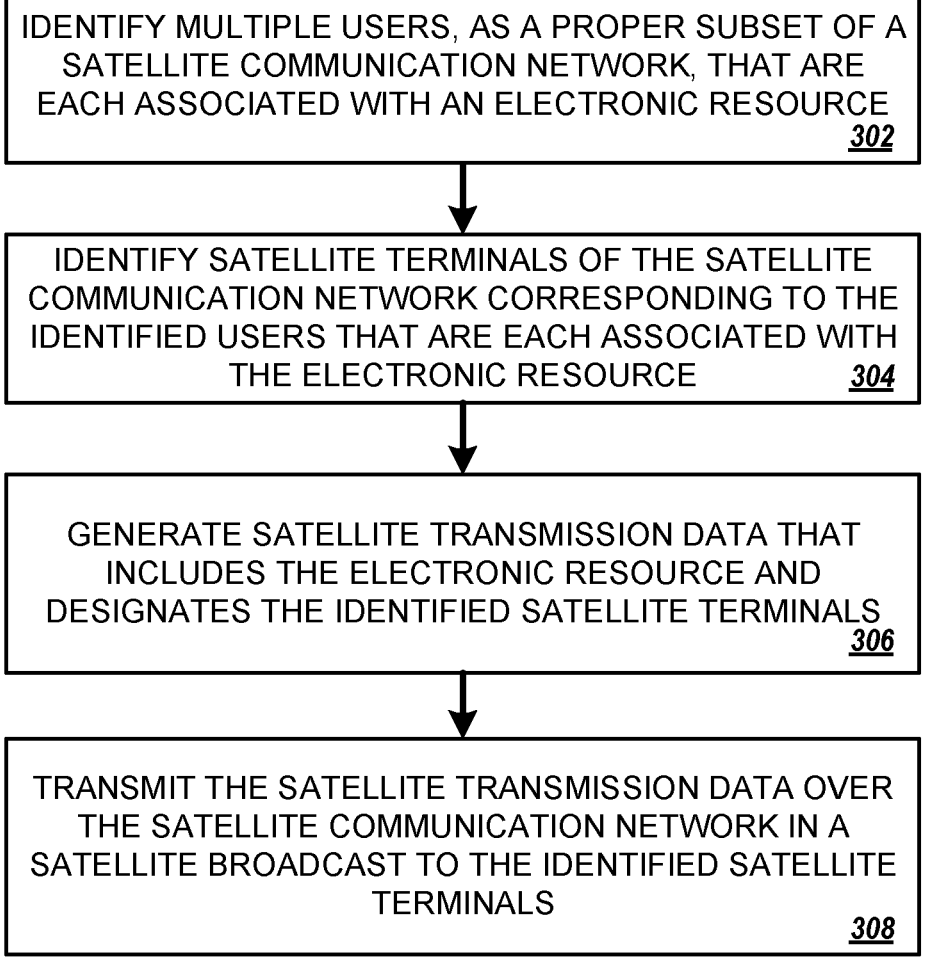
FIG. 3 is a flow diagram that illustrates an example process for transmitting an electronic resource to multiple users.

FIG. 3 is a flow diagram that illustrates an example process 300 for transmitting an electronic resource to one or more users. The process 300 may be performed by a system that includes one or more computers. The one or more computers can include one or more processors. The one or more computers can also include one or more data storage devices storing instructions that, when executed, cause the one or more computers to perform the actions of the process 300. The steps of the process 500 may be performed in the order shown in FIG. 3, or in another order.

In step (302), multiple users that are associated with an electronic resource are identified. The multiple users may be a proper subset of the users of a satellite communication network. That is, the multiple users include less than all of the users of the satellite communication network. As described above, each of the multiple users may be associated with the electronic resource by subscribing to receive the electronic resource, by being included in a list of users designated to receive the electronic resource, and/or based on a user profile or usage history that indicates interest in the electronic resource (or resources of the same type or category as the electronic resource).

In step (304), satellite terminals of the satellite communication network corresponding to the identifiers users are identified. For example, each user can include a satellite terminal that requests and/or receives electronic resources over the satellite communication network. Each satellite terminal can include a unique identifier that is associated with an identifier of the user. After identifying the users that are associated with the electronic resource, the association between the identifiers of the users and the satellite terminals can be used to identify the satellite terminals of the users.

In step (306), satellite transmission data is generated. The satellite transmission data can include the electronic resource. The satellite transmission data can also designate each of the multiple users associated with the electronic resource. For example, the satellite transmission data can include the unique identifier of each identified satellite terminals for the users associated with the electronic resource.

In step (308), the satellite transmission data is transmitted over the satellite communication network. For example, the satellite transmission data may be broadcast to all satellite terminals within a satellite's ground footprint such that the identified satellite terminals can concurrently receive data associated with the electronic resource (e.g., the electronic resource itself, data included in the electronic resource, data that defines the electronic resource, or data that represents a change or update to the electronic resource) without sending a request for data associated with the electronic resource. The satellite terminals that are designated by the satellite transmission data can store the electronic resource in local memory or send the electronic resource to a user device for storage in local memory of the user device. Satellite terminals that are not designated may not be able to access the electronic resource (e.g., due to encryption) or may disregard the satellite transmission data in response to not being designated by the satellite transmission data.

Figure 4:
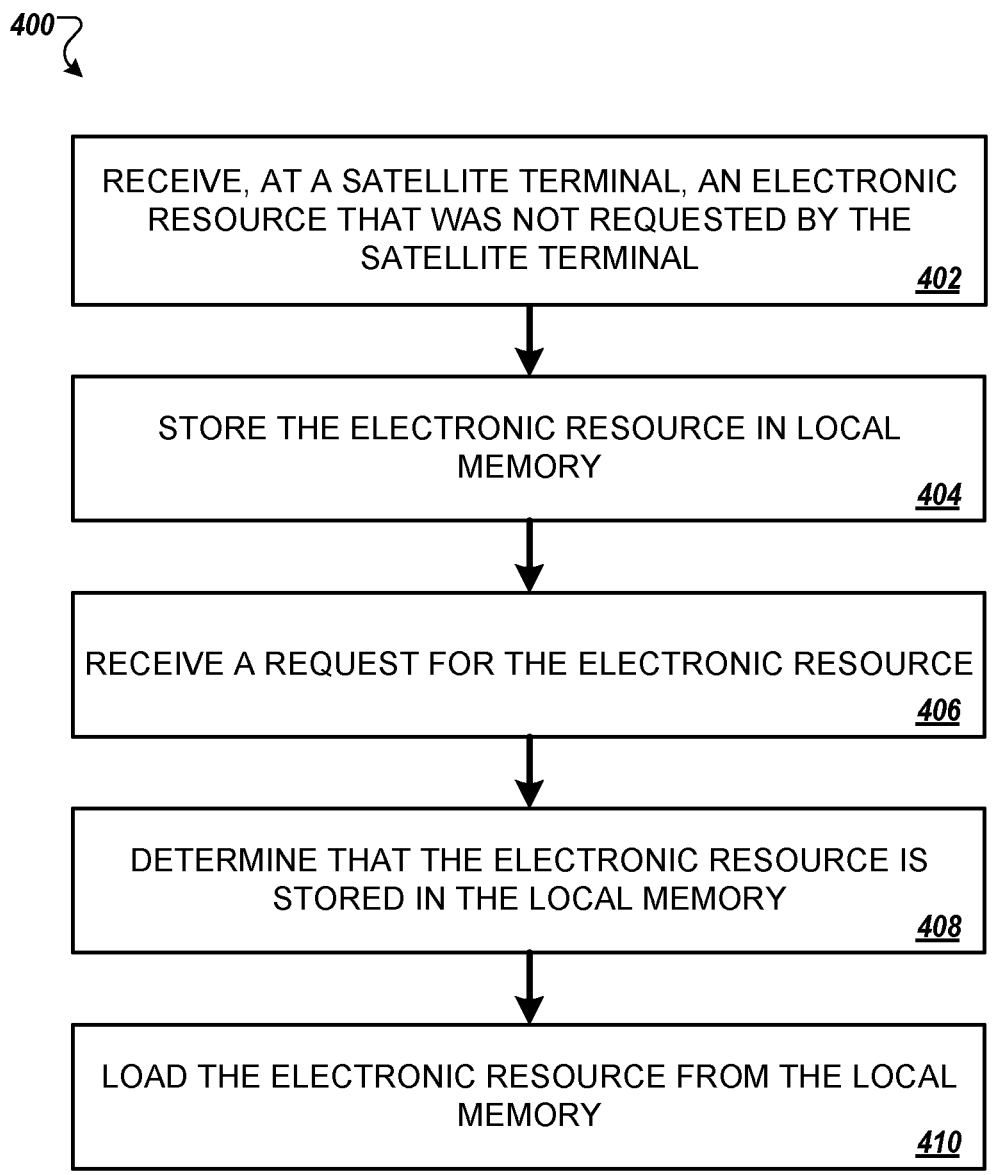
FIG. 4 is a flow diagram that illustrates an example process for loading an electronic resource from local memory.

FIG. 4 is a flow diagram that illustrates an example process 400 for loading an electronic resource from a local memory. The process 400 may be performed by a system that includes one or more computers. The one or more computers can include one or more processors. The one or more computers can also include one or more data storage devices storing instructions that, when executed, cause the one or more computers to perform the actions of the process 400. The steps of the process 400 may be performed in the order shown in FIG. 4, or in another order.

In step (402), a satellite terminal receives an electronic resource that was not requested by the satellite terminal. For example, the electronic resource may be included in satellite transmission data that designates the satellite terminal. The electronic resource may be pushed to the satellite terminal based on a user of the satellite terminal being associated with the electronic resource. For example, the latest version of the electronic resource may be broadcast to satellite terminals of the users associated with the electronic resource periodically or in response to the electronic resource being updated.

In step (404), the electronic resource is stored in local memory. For example, the satellite terminal may store the electronic resource in local memory of the satellite terminal. In another example, the satellite terminal can provide the electronic resource to a user device that stores the electronic resource in local memory of the user device.

In step (406), a request for the electronic resource is received. For example, a user may request the electronic resource using a web browser or other application. The user device can receive the request.

In step (408), a determination is made that the electronic resource is stored in local memory. For example, the user device may attempt to retrieve the electronic resource in local memory of the user device. If the electronic resource is not in the local memory of the user device, the user device may request the electronic resource from the satellite terminal. If the satellite terminal includes local memory for caching electronic resources, the satellite terminal may attempt to retrieve the electronic resource from the local memory. If the electronic resource is not in either local memory, the satellite terminal can request the electronic resource over the satellite communication network.

In step (410), the electronic resource is loaded from the local memory. The electronic resource may then be presented to the user.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method, comprising:
    identifying, by one or more processors, multiple users that are each associated with a same electronic resource, wherein the multiple users are a proper subset of users of a satellite communication network;
    identifying, by the one or more processors, satellite terminals of the satellite communication network corresponding to the identified users that are each associated with the electronic resource;
    generating, by the one or more processors, satellite transmission data that comprises the electronic resource and designates the identified satellite terminals;
    transmitting, by a satellite gateway in data communication with the one or more processors, the satellite transmission data over the satellite communication network in a satellite broadcast to the identified satellite terminals, such that the identified satellite terminals can concurrently receive the electronic resource without sending a request for the electronic resource; and
    tracking, for at least one of the identified users, an amount of satellite-transmitted data consumed by the user, including updating a data usage measure for the user by different amounts based on whether data transmitted to the satellite terminal of the user was transmitted (i) in response to a request from the satellite terminal of the user or (ii) in a satellite broadcast to multiple satellite terminals including the satellite terminal of the user.

2. The method of claim 1, wherein generating the satellite transmission data comprises configuring a satellite transmission layer of the satellite transmission data to specify each of the identified satellite terminals.

3. The method of claim 2, wherein configuring the satellite transmission layer comprises configuring a header of the satellite transmission data to specify each of the identified satellite terminals.

4. The method of claim 1, wherein transmission of the electronic resource to each identified satellite terminal does not increase the data usage measure for the user of the identified satellite terminal.

5. The method of claim 1, wherein transmission of the electronic resource to each identified satellite terminal increases the data usage measure for the user of the identified satellite terminal by a first amount that is less than a second amount with which the data usage measure for the user is increased in response to a user-submitted request for the electronic resource.

6. The method of claim 1, wherein identifying the multiple users comprises determining that at least one of the identified users has subscribed to receiving the electronic resource.

7. The method of claim 1, wherein identifying the multiple users comprises determining that at least one of the identified users previously requested other electronic resources from a source of the electronic resource.

8. The method of claim 1, wherein identifying the multiple users comprises determining that at least one of the identified users previously requested a previous version of the electronic resource.

9. The method of claim 1, wherein each identified satellite terminal stores the electronic resource in a local cache of the identified satellite terminal or a local cache of a user device in data communication with the identified satellite terminal.

10. The method of claim 9, wherein a particular identified satellite terminal corresponding to a particular identified user requests the electronic resource and, in response, the particular identified satellite terminal:
    determines that the electronic resource is stored in the local cache of the particular identified satellite terminal or the local cache of the user device in data communication with the particular identified satellite terminal; and
    loads the electronic resource from the local cache rather than transmitting a request for the electronic resource to the satellite gateway.

11. The method of claim 1, further comprising:
    selecting, for a particular user of the identified users, an advertisement based on at least one of content of the electronic resource or data indicating electronic resources previously accessed by the user; and
    providing the selected advertisement to the satellite terminal of the particular user for presentation to the particular user.

12. The method of claim 1, wherein the electronic resource comprises at least one of a digital file, a web page, an application page, text data, video data, image data, or audio data.

13. The method of claim 1, wherein updating the data usage measure for the user by different amounts based on whether data transmitted to the satellite terminal of the user was transmitted (i) in response to a request from the satellite terminal of the user or (ii) in a satellite broadcast to multiple satellite terminals including the satellite terminal of the user comprises:
    increasing the data usage measure for the user by a first amount for data transmitted to the satellite terminal of the user in response to a request from the satellite terminal of the user; and
    increasing the data usage measure for the user by a second amount that is less than the first amount for data transmitted to the satellite terminal of the user in a satellite broadcast to multiple satellite terminals including the satellite terminal of the user.

14. A system comprising:
    a data processing apparatus;
    a computer storage medium storing instructions that, when executed by the data processing apparatus, cause the data processing apparatus to perform operations comprising:

identifying, by one or more processors, multiple users that are each associated with a same electronic resource, wherein the multiple users are a proper subset of users of a satellite communication network;

identifying, by the one or more processors, satellite terminals of the satellite communication network corresponding to the identified users that are each associated with the electronic resource;

generating, by the one or more processors, satellite transmission data that comprises the electronic resource and designates the identified satellite terminals; and tracking, for at least one of the identified users, an amount of satellite-transmitted data consumed by the user, including updating a data usage measure for the user by different amounts based on whether data transmitted to the satellite terminal of the user was transmitted (i) in response to a request from the satellite terminal of the user or (ii) in a satellite broadcast to multiple satellite terminals including the satellite terminal of the user; and a satellite gateway in data communication with the data processing apparatus and that transmits the satellite transmission data over the satellite communication network in a satellite broadcast to the identified satellite terminals, such that the identified satellite terminals can concurrently receive the electronic resource without sending a request for the electronic resource.

15. The system of claim 14, wherein generating the satellite transmission data comprises configuring a satellite transmission layer of the satellite transmission data to specify each of the identified satellite terminals.

16. The system of claim 15, wherein configuring the satellite transmission layer comprises configuring a header of the satellite transmission data to specify each of the identified satellite terminals.

17. The system of claim 14, wherein transmission of the electronic resource to each identified satellite terminal does not increase the data usage measure for the user of the identified satellite terminal.

18. The system of claim 14, wherein transmission of the electronic resource to each identified satellite terminal increases the data usage measure for the user of the identified satellite terminal by a first amount that is less than a second amount with which the data usage measure for the user is increased in response to a user-submitted request for the electronic resource.

19. The system of claim 14, wherein identifying the multiple users comprises determining that at least one of the identified users has subscribed to receiving the electronic resource.

20. A non-transitory computer readable medium comprising instructions that, when executed by a data processing apparatus, cause the data processing apparatus to perform operations comprising:

identifying, by one or more processors, multiple users that are each associated with a same electronic resource, wherein the multiple users are a proper subset of users of a satellite communication network;

identifying, by the one or more processors, satellite terminals of the satellite communication network corresponding to the identified users that are each associated with the electronic resource;

generating, by the one or more processors, satellite transmission data that comprises the electronic resource and designates the identified satellite terminals;

providing the satellite transmission data to a satellite gateway, wherein the satellite gateway transmits the satellite transmission data over the satellite communication network in a satellite broadcast to the identified satellite terminals, such that the identified satellite terminals can concurrently receive the electronic resource without sending a request for the electronic resource; and tracking, for at least one of the identified users, an amount of satellite-transmitted data consumed by the user, including updating a data usage measure for the user by different amounts based on whether data transmitted to the satellite terminal of the user was transmitted (i) in response to a request from the satellite terminal of the user or (ii) in a satellite broadcast to multiple satellite terminals including the satellite terminal of the user.

* * * * *